(12) United States Patent
Perrin

(10) Patent No.: US 12,256,156 B2
(45) Date of Patent: Mar. 18, 2025

(54) METHOD FOR PROCESSING A PIXELS MATRIX IN AN IMAGE PROCESSING CHAIN AND CORRESPONDING ELECTRONIC DEVICE

(71) Applicant: STMicroelectronics France, Montrouge (FR)

(72) Inventor: Pol Perrin, Paris (FR)

(73) Assignee: STMicroelectronics France, Montrouge (FR)

( * ) Notice: Subject to any disclaimer, the term of this patent is extended or adjusted under 35 U.S.C. 154(b) by 261 days.

(21) Appl. No.: 17/940,742

(22) Filed: Sep. 8, 2022

(65) Prior Publication Data
US 2023/0095645 A1  Mar. 30, 2023

(30) Foreign Application Priority Data
Sep. 27, 2021  (FR) .................................... 2110166

(51) Int. Cl.
*H04N 23/84*  (2023.01)
*G06T 3/4015*  (2024.01)
(Continued)

(52) U.S. Cl.
CPC ......... *H04N 23/843* (2023.01); *G06T 3/4015* (2013.01); *H04N 9/646* (2013.01);
(Continued)

(58) Field of Classification Search
CPC .... G06T 3/4015; H04N 23/843; H04N 23/11; H04N 25/131
See application file for complete search history.

(56) References Cited

U.S. PATENT DOCUMENTS 5,552,825 A * 9/1996 Talluri ................. H04N 23/843
   348/222.1
6,091,851 A   7/2000 Acharya
(Continued)

FOREIGN PATENT DOCUMENTS

EP       804037 A2 * 10/1997  ............. H04N 9/045

OTHER PUBLICATIONS

EPO, European Search Opinion for EP 4156080 A1 (Dec. 6, 2022) (Year: 2022).*

(Continued)

*Primary Examiner* — David N Werner
(74) *Attorney, Agent, or Firm* — Slater Matsil, LLP

(57) ABSTRACT

The method for processing a matrix of pixels each containing an original red, green, blue, or infrared component, comprises at least one interpolation of an interpolated component different from the original component of a pixel of interest from the components of a group of pixels neighboring the pixel of interest. The interpolation comprises: a calculation of the sum of the components of reference pixels weighted by a respectively assigned weight, the reference pixels being pixels of the group having the same original component as the interpolated component, an evaluation of the spatial uniformity of an environment, within the group of each reference pixel, a calculation of the weights assigned to the reference pixels at values which are normalized and proportional to the respective spatial uniformity.

20 Claims, 6 Drawing Sheets

(51) Int. Cl.
 H04N 9/64 (2023.01)
 H04N 23/10 (2023.01)
 H04N 23/11 (2023.01)
 H04N 25/131 (2023.01)
(52) U.S. Cl.
 CPC ............. H04N 23/10 (2023.01); H04N 23/11 (2023.01); H04N 25/131 (2023.01)

(56) References Cited

U.S. PATENT DOCUMENTS

| | | | | |
|---|---|---|---|---|
| 2010/0002954 A1* | 1/2010 | Lukac | ................... | G06T 3/4015 |
| | | | | 348/625 |
| 2010/0182464 A1* | 7/2010 | Lukac | .................. | H04N 25/134 |
| | | | | 348/E5.024 |
| 2010/0295947 A1* | 11/2010 | Boulanger | ........... | H04N 25/135 |
| | | | | 348/E5.09 |
| 2013/0329101 A1* | 12/2013 | Choi | .................... | H04N 25/135 |
| | | | | 348/273 |
| 2017/0090149 A1* | 3/2017 | Galor Gluskin | ..... | H04N 23/843 |
| 2017/0111566 A1 | 4/2017 | Nemoto | | |
| 2018/0007334 A1* | 1/2018 | Lim | .......................... | G06T 1/20 |
| 2019/0141268 A1 | 5/2019 | Huang | | |
| 2020/0280659 A1* | 9/2020 | Galor Gluskin | ....... | H04N 23/55 |
| 2021/0185285 A1 | 6/2021 | Sun et al. | | |

OTHER PUBLICATIONS

EPO, European Search Report for EP 4156080 A1 (Dec. 6, 2022) (Year: 2022).*

Rebiere, Valentin et al., "Semi-Gradient for Color Pixel Reconstruction in a Rgbz Cmos Sensor," 2020 IEEE, Sensors, Oct. 25, 2020, 4 pages.

* cited by examiner

FIG.6
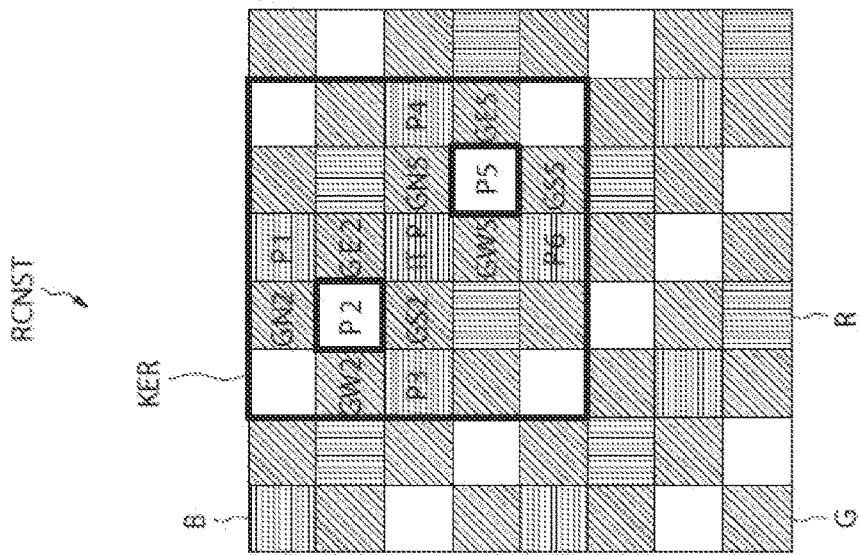
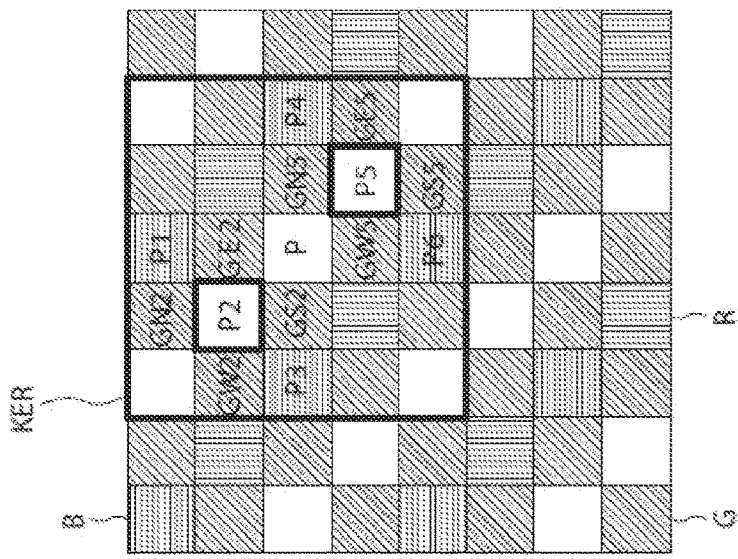
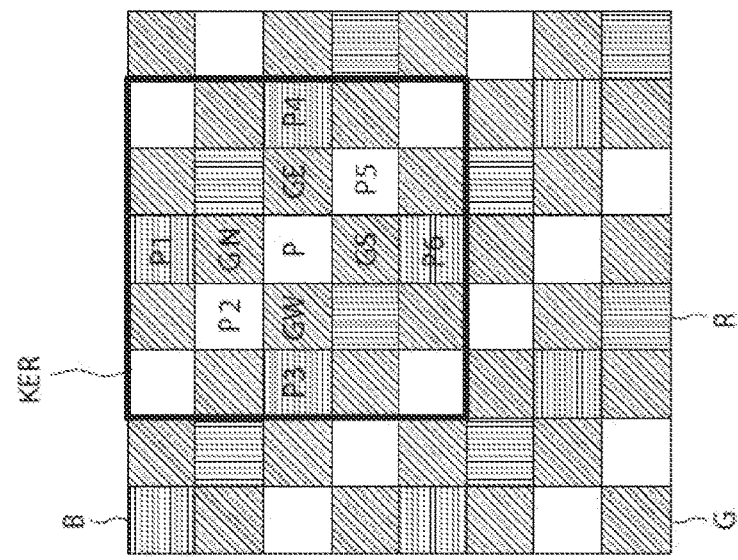

METHOD FOR PROCESSING A PIXELS MATRIX IN AN IMAGE PROCESSING CHAIN AND CORRESPONDING ELECTRONIC DEVICE

CROSS-REFERENCE TO RELATED APPLICATIONS

This application claims priority to French Patent Application No. 2110166, filed on Sep. 27, 2021, which application is hereby incorporated by reference herein in its entirety.

TECHNICAL FIELD

The present disclosure generally relates to image processing, and in particular embodiments, to the processing of matrices of red, green, blue, and infrared (RGB-IR) pixels.

BACKGROUND

Generally, "RGB-IR" pixel matrices are obtained from an imager used in a "machine vision" system, exploiting both visible and infrared information items. Indeed, in a machine vision framework, infrared can allow different processing of information from a scene. For example, the gaze of a vehicle's driver in very low light conditions (in the visible) can be followed using an active illumination technique via an infrared emitter. In another example, a time-of-flight measurement can be performed.

Typically, "RGB-IR" imaging technologies are equipped with matrices including an interlaced pattern of photosensitive pixels dedicated to the visible light components and photosensitive pixels dedicated to an infrared light component. The photosensitive pixels generate an electrical signal representative of the amount of light received during an acquisition phase regardless of its wavelength. The components of the photosensitive pixels are conventionally defined by respectively blue, green, red, and infrared bandwidth optical filters with respect to the corresponding photosensitive pixels. Furthermore, an optical module above the pixel matrix typically incorporates a dual-band filter with a thin spectral band in the infrared specifying the sensitivity over the wavelength of the active source and a spectral band in the visible.

As a result, the pixels dedicated to the infrared receive the signal from the active source, but the pixels dedicated to the visible components receive the signal as well and are therefore partly polluted by this amount of infrared.

This type of RGB-IR imager is advantageous in particular in terms of size. Still, the presence and the particular spatial distribution of infrared photosensitive pixels among the red, green, and blue photosensitive pixels have difficulties in image processing downstream of the optical signal acquisition.

Indeed, on the one hand, the infrared wavelength band is typically not filtered for visible photosensitive pixels, consequently generating signals degraded by infrared noise. On the other hand, the visible resolution is reduced due to the presence of dedicated infrared photosensitive pixels. Furthermore, the format of this type of RGB-IR matrix is typically not adapted for conventional image processing, the latter being conventionally provided for matrices in the conventional format and known per se "from Bayer."

Thus, in this type of RGB-IR matrix, algorithms for infrared depollution processing, replacement of infrared components by visible components, and formatting in Bayer format are typically provided at the start of the image processing chain.

These different processing conventionally comprise bilinear interpolation techniques, i.e., briefly a reconstruction of a missing information item (i.e., respectively, the infrared noise components, the visible components replacing the infrared components, and the visible components of Bayer format reconstruction) made by arithmetic average of the corresponding information items from neighboring pixels.

However, the bilinear interpolation processing applied to matrices of the RGB-IR type lack performance in terms of final image quality because these conventional processing reveals structural and color artifacts, in particular at the strong transition areas between pixels (i.e., for example, areas with high contrast), degrading the quality of the image obtained, There is a need to propose pixel matrix processing techniques of the "RGB-IR" type to improve the quality of the processed image, in particular in the context of infrared depollution processing in the visible components, of reconstruction of missing pixel components, and of Bayer matrix formatting.

SUMMARY

Embodiments and implementations defined below propose an interpolation technique adapted for these three types of processing, wherein the variations in textures and edges in the image are taken into account to adjust a weight assigned to the components of neighboring pixels. The weight assignment is done so that the strongest weights are given to the pixels located in the "flattest" or "the least textured," i.e., the most uniform areas. This allows to improve the image quality and leads to a more faithful reproduction.

According to one aspect, provision is thus made of a method for processing, within an image processing chain intended to be connected to an imager, a matrix of pixels each containing an original red, green, blue, or infrared component, the method comprising at least one interpolation of an interpolated component different from the original component of a pixel of interest from the components of a group of pixels neighboring the pixel of interest, the interpolation comprising: a calculation of the sum of components of reference pixels weighted by a respectively assigned weight, the reference pixels being pixels of the group having the same original component as the interpolated component, an evaluation of the spatial uniformity of an environment, within the group, of each reference pixel, a calculation of the weights assigned to the reference pixels at values which are normalized and proportional to the respective spatial uniformity.

In the context of image processing, the meaning of the term "pixel" corresponds to a given position in the matrix of digital data resulting from an image acquisition; each pixel contains a single digital datum, called a component, representative of the respective red, green, blue or infrared component intensity in the image at the position of that pixel.

The term "proportional" is understood in the broad sense, i.e., that the value of the assigned weight varies in the same sense as the evaluated uniformity and not in the strict sense of a constant ratio between these quantities. Thus, the values of the weights increase when the uniformity rises and decrease when the uniformity decreases to assign a high-value weight to the component of a pixel located in an environment of high uniformity and, conversely a weight of lower value to the component of a pixel located in an environment of lower uniformity.

Thus, in the method according to this aspect, the variations in textures and edges are taken into account in the calculation of the interpolated component to amplify the influence of the components of the reference pixels most representative of the environment of the pixel of interest, and as a corollary to restrict the influence of the components of the reference pixels belonging to transition areas in the image, less representative of the environment of the pixel of interest.

According to one embodiment, the evaluation of the spatial uniformity of each reference pixel comprises a calculation of gradients on the components of the pixels having the original green component adjacent to the respective reference pixels.

For example, the calculation of the gradients comprises a measurement of the absolute difference between the greatest value and the smallest value of the components of the pixels having the original green component adjacent to the reference pixels.

Indeed, the calculation of gradients by definition provides an information item on the spatial variation of the calculated elements and, consequently, on the spatial uniformity. The use of "green pixels" (i.e., the pixels having the original green component) adjacent to the reference pixels is advantageous given that the green pixels are usually more numerous in the matrix and can thus provide an information item on the closer environment to the reference pixel. Indeed, the green pixels are typically present with greater density in the case of RGBIR matrices because the green channel is the most representative of the variations in light intensity perceived by the human eye.

According to one implementation, the evaluation of the spatial uniformity comprises an identification of the orientation of spatial variation from a comparison of the components of the reference pixels and a selection of the pixels having the original green component used for the calculation of the gradients, in the identified orientation.

This embodiment, particularly but not exclusively adapted to infrared noise depollution processing, corresponds to carrying out a first approximation of the uniformity from the components of the reference pixels to restrict the quantity of green pixels adjacent to the reference pixels used in the calculation of gradients.

According to one implementation, the group of pixels neighboring the pixel of interest comprises a set of pixels belonging to a square of pixels having an odd number of pixels on each side, for example, five pixels, the pixel of interest being located in the center of the square.

According to one embodiment, a pixel matrix is delivered to the processing chain by the imager according to an elementary pattern of the "RGB-IR 4×4" type, including two red pixels (i.e., pixels having the original red component), eight green pixels (i.e., pixels having the original green component), two blue pixels (i.e., pixels having the original blue component), and four infrared pixels (i.e., pixels having the original infrared component), arranged so that each red, blue and infrared pixel is adjacent only to green pixels.

According to one implementation, the interpolation is implemented in the processing of depollution of an infrared noise from the pixels, the interpolated component being the infrared component, the pixels of interest having the original red, green, and blue components.

According to one implementation, the interpolation is implemented in the processing of reconstruction of a visible component instead of an infrared component, the interpolated components being the red and blue components, the pixels of interest having the original infrared component.

According to one implementation, the interpolation is implemented in the processing for formatting the pixel matrix into a Bayer matrix, the interpolated components being either red or blue, the pixels of interest having an original component respectively either blue or red.

According to another aspect, provision is made of an electronic device including an image processing chain intended to be connected to an imager, and configured to carry out a processing on a matrix of pixels each containing an original red, green, blue, or infrared component, the processing comprising at least one interpolation of an interpolated component different from the original component of a pixel of interest from the components of a group of pixels neighboring the pixel of interest, wherein to implement the interpolation, the processing chain is configured to: calculate the sum of the components of the reference pixels weighted by a respectively assigned weight, the reference pixels being pixels of the group having the same original component as the interpolated component, evaluate the spatial uniformity of an environment, within the group, of each reference pixel, calculate the weights assigned to the reference pixels at values which are normalized and proportional to the respective spatial uniformity.

According to one embodiment, to evaluate the spatial uniformity of each reference pixel, the processing chain is configured to calculate gradients on the components of the pixels having the original green component adjacent to the respective reference pixel.

For example, the processing chain is configured to calculate the gradients by measuring the absolute difference between the greatest and smallest values of the components of the pixels having the original green component adjacent to the reference pixels.

According to one embodiment, to evaluate the spatial uniformity of each reference pixel, the processing chain is configured to compare components of the reference pixels and to identify an orientation of spatial variation from the comparison, and to select the pixels having the original green component used for the calculation of the gradients, in the identified orientation.

According to one embodiment, the group of pixels neighboring the pixel of interest comprises a set of pixels belonging to a square of pixels having an odd number of pixels on each side, the pixel of interest being located at the center of the square.

According to one embodiment, the processing chain is configured to process a matrix of pixels according to an elementary pattern of the "RGB-IR 4×4" type, including two red pixels, eight green pixels, two blue pixels, and four infrared pixels, arranged so that each red, blue, and infrared pixel is only adjacent to green pixels.

According to one embodiment, the processing chain includes a processing means for depolluting an infrared noise from the pixels configured to implement the interpolation so that the interpolated component is the infrared component, and the pixels of interest have the original red, green, and blue components.

According to one embodiment, the processing chain includes a processing means for reconstructing a visible component instead of an infrared component, configured to implement the interpolation so that the interpolated components are the red and blue components, and the pixels of interest have the original infrared component.

According to one embodiment, the processing chain includes a processing means for formatting the pixel matrix into a Bayer matrix, configured to implement the interpolation so that the interpolated components are respectively either red or blue, and the pixels of interest have an original component, which is respectively either blue or red.

BRIEF DESCRIPTION OF THE DRAWINGS

For a more complete understanding of the present disclosure and the advantages thereof, reference is now made to the following descriptions taken in conjunction with the accompanying drawings, in which:

FIGS. 2-6 are embodiments of photosensitive pixels.

DETAILED DESCRIPTION OF ILLUSTRATIVE EMBODIMENTS

Figure 1:
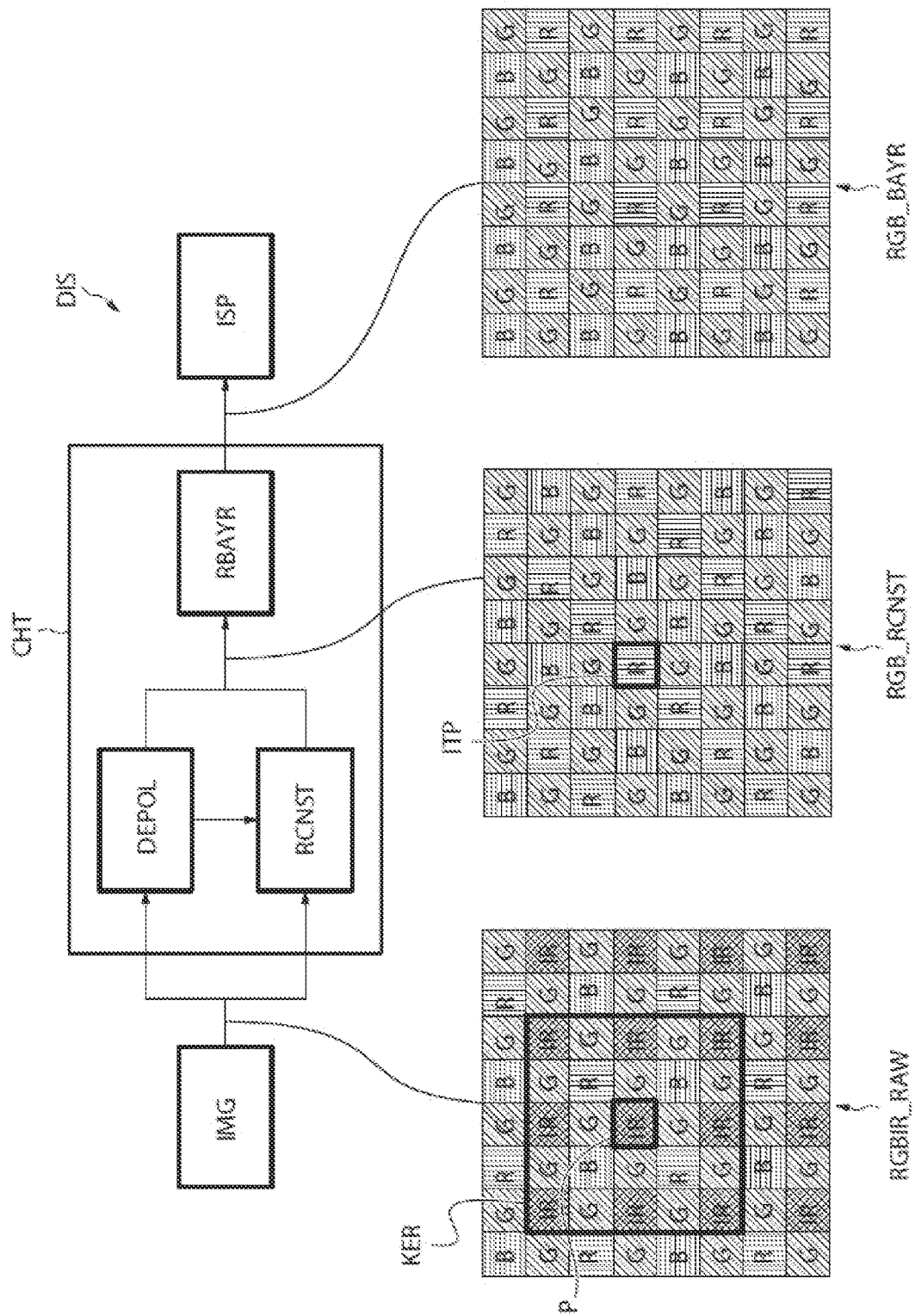
FIG. 1 is a block diagram of an embodiment electronic device and photosensitive pixels.

FIG. 1 illustrates an electronic device DIS, including an image processing chain CHT. An input of the image processing chain CHT is intended to be connected to an imager IMG, and an output of the image processing chain CHT is intended to be connected to an image signal processing unit ISP.

The imager IMG or the image signal processing unit ISP may belong to the device DIS in a variant that is fully integrated or not. The imager IMG includes a matrix of photosensitive "pixels" in an RGB-IR type configuration, including an interlaced pattern of photosensitive pixels dedicated to the visible light components and photosensitive pixels dedicated to an infrared light component.

The photosensitive pixels generate an electrical signal representative of the amount of light received during an acquisition phase regardless of its wavelength. The components of the photosensitive pixels are conventionally defined by respectively blue, green, red, and infrared optical filters facing the corresponding photosensitive pixels. Furthermore, above the pixel matrix, an optical module typically incorporates a dual-band filter with a thin infrared spectral band specifying the sensitivity on infrared wavelengths and a visible spectral band. Consequently, the pixels dedicated to the infrared receive an infrared signal, but the pixels are also dedicated to the visible components, and are therefore partly polluted by this amount of infrared.

The signals generated by the photosensitive pixels of the imager IMG are communicated to the processing chain CHT in the form of a "raw" digital data matrix RGBIR_RAW, also called "data pixels" or simply "pixels."

In the following, which relates to the processing of a digital image data matrix, the meaning of the term "pixel" corresponds to a position of a datum in the digital data matrix, this position being typically identical to the position of the photosensitive pixel corresponding in the photosensitive matrix of the imager IMG.

Furthermore, each pixel is considered to contain a single digital datum, called component, representative of the intensity of the respective red, green, blue, or infrared component in the image at the position of that pixel.

In this example, the "raw" digital data matrix RGBIR_RAW is of the RGB-IR 4×4 type, i.e., an elementary pattern of the matrix (i.e., the smallest element that can be repeated to compose the matrix) includes, in a sixteen-pixel square, two red R pixels, eight green G pixels, two blue B pixels, and four infrared IR pixels, arranged so that each red R, blue B, and infrared IR pixel is adjacent only to green G pixels, and typically so that the red R, blue B, and infrared IR pixels are substantially equally distributed in the elementary pattern.

The processing chain CHT includes a processing means for depolluting DEPOL an infrared noise from the pixels configured to interpolate an infrared noise component in the red R, green G, and blue B pixels of the raw data matrix RGBIR_RAW. The depollution processing means DEPOL is thus capable of subtracting the infrared noise component from the information item contained in each visible pixel R, G, B, and of providing the corresponding "depolluted" components downstream of the processing chain CHT, in particular to a reconstruction processing means RCNST and to a formatting processing means RBAYR.

The processing chain CHT further includes a means RCNST for a processing reconstruction of a visible component instead of an infrared component, configured to interpolate a reconstituted red R or blue B component, at the position of the infrared IR pixels of the raw data matrix RGBIR_RAW. The reconstruction processing means RCNST is thus capable of providing a reconstructed matrix RGB_RCNST of the non-Bayer RGB type, containing only visible R, G, and B components, but in a format that is not the Bayer format. For example, the matrix RGB_RCNST of the non-Bayer RGB type includes an elementary pattern in a square of sixteen pixels.

In practice, the depollution processing means DEPOL and the reconstruction processing means RCNST can be pooled so that their respective functions are implemented in an "interlaced" and concomitant manner, for example, within the framework of a single pass algorithm.

In this case, during the first phase of the processing chain CHT, the processing of depollution DEPOL of an infrared noise from the visible pixels R, G, and B, and simultaneously, the reconstruction processing RCNST of a visible component instead of an infrared component, use the information items obtained by scanning the "raw" digital data matrix RGBIR_RAW row by row and perform the processing pixel by pixel. The input image RGBIR_RAW is scanned only once hence the term "single pass."

Briefly, in the manner more fully described below in relation to FIG. 1, as well as on the one hand with FIGS. 2 to 4 and on the other hand with FIG. 5, when the "raw" digital data matrix RGBIR_RAW is scanned, depending on the original component of the processed pixel:

If the processed pixel has the original infrared IR component, the depollution processing of the two red R (or blue B) reference pixels is carried out "on the fly," and the interpolation calculation is then carried out from the depolluted reference pixels. The depolluted reference pixels are then stored in the output image, replacing the initial polluted value.

If the pixel of interest has the original green component G, the depollution processing is executed.

If the pixel of interest has the original red R or blue B component, then: either the pixel has already been depolluted, or it has not already been depolluted (when the pixel of interest does not correspond to any diagonal of an infrared pixel, i.e., it is in an angle), and in this case, the depollution processing is carried out.

The processing chain CHT finally includes a means for formatting processing RBAYR into a Bayer matrix RGB_BAYR, configured to interpolate, in the reconstructed matrix RGB_RCNST, reconstituted red components R instead of blue components B and reconstituted blue components B instead of red components R, to provide a matrix processed in the Bayer format RGB_BAYR.

The Bayer format includes an elementary pattern in a four-pixel square, containing one red R pixel, one blue B pixel on one diagonal, and two green G pixels on the other diagonal.

The processed matrix RGB_BAYR can then be "handled" by an image signal processing unit ISP, which is conventional and, in embodiments, adapted for Bayer format matrices.

Each processing means DEPOL, RCNST, and RBAYR is, thus, configured to implement, in embodiments, an interpolation of a component, called an interpolated component.

The components of the pixels of the data matrices transmitted on the inputs of each of the processing means and processed by each of the processing means are called original components.

The pixel on which the interpolated component is calculated is called the pixel of interest P. In the resulting processing matrix, the pixel of interest is called interpolated pixel ITP.

For clarity, the following references are shown in relation to the reconstruction processing of a visible component instead of an infrared component RCNST, performed on the raw digital data matrix RGBIR_RAW. This being the case, the interpolation method is described below for the general case, applying equally well in the depollution processing DEPOL on the raw data matrix RGBIR_RAW, in the reconstruction processing RCNST on the raw data matrix RGBIR_RAW and collaboration with at least some pixels resulting from the depollution processing DEPOL, and in the formatting processing RBAYR on the reconstructed and depolluted matrix RGB_RCNST.

Thus, for a pixel of interest P of a processed matrix RGBIR_RAW, RGB_RCNST, i.e., the location of a datum in the matrix, the original component (in this example, infrared) IR is the information item known at the input of the processing, contained by this pixel P or by pixels KER neighboring the pixel of interest P. In contrast, the interpolated component ITP is an information item at the position of the pixel of interest P in the matrix, which is unknown before the processing and "reconstructed" or "reconstituted" by calculations executed by the respective processing means DEPOL, RCNST, RBAYR.

The interpolation implemented by each processing means DEPOL, RCNST, and RBAYR, uses the known information items of the original components of the pixels of the matrix, in particular the pixels KER neighboring the pixel of interest P, by assigning them a respective weight. The weight is conventionally a coefficient of distribution of the influence in the calculation of each weighted value relative to the others.

In the interpolation implemented by the processing means DEPOL, RCNST, and RBAYR, the allocation of the weights is adjusted, taking into account the variations in textures and edges in the image, so that the strongest weights are given to the pixels located in the "flattest," i.e., the most uniform, or "the least textured" areas.

In this regard, the interpolation of an interpolated component ITP, different from the original component of a pixel of interest P is made from the components of a group of pixels KER neighboring the pixel of interest P, called kernel or pixel kernel KER.

For example, the group of pixels neighboring the pixel of interest P, i.e., the kernel KER, comprises a set of pixels belonging to a square of pixels having an odd number of pixels (for example, five) on each side, the pixel of interest P being located in the center of the square KER.

Thus, the interpolation comprises a calculation of the sum of the components of reference pixels weighted by a respectively assigned weight, the reference pixels being the pixels of the kernel KER having the same original component (in this example, red) R as the interpolated component R of the resulting pixel ITP in the processed matrix RGB_RCSNT.

To obtain the weights, the interpolation comprises an evaluation of a spatial uniformity of an environment, within the kernel KER, of each reference pixel (in this example, the pixels having the red component in the kernel KER) R, and a calculation of the weights assigned to the reference pixels R at values normalized and proportional to the respective spatial uniformity.

The evaluation of the spatial uniformity of the reference pixels R advantageously comprises a calculation of gradients on the components of the pixels having the original green component G adjacent to the respective reference pixels R. For example, the calculation of the gradients can be obtained by a measurement of the absolute difference between the greatest value and the smallest value of the components of the green pixels G adjacent to the reference pixels R.

Within the framework of an implementation of "single pass" depollution DEPOL and reconstruction RCNST processing, the pixels having the original green component G come from the raw data matrix RGBIR_RAW and have not yet received the depollution DEPOL processing at the time of the implementation of the calculation of the gradients mentioned above. This does not pose a problem in practice since it is assumed that the green G components and the infrared noise components on these pixels are correlated, i.e., the infrared noise components are generally uniform in the areas where the green G components are generally uniform, and the infrared noise components have variations in areas where the green G components have variations. Consequently, the presence of the infrared noise component in the data taken into account in calculating the gradients has little or no impact on the final weighting decision.

Reference is now made to FIGS. 2 to 6 to detail different cases of evaluation of the spatial uniformity of the environment of the reference pixels, as well as the calculations of the weights and the interpolated component of the respective cases.

Figure 2:
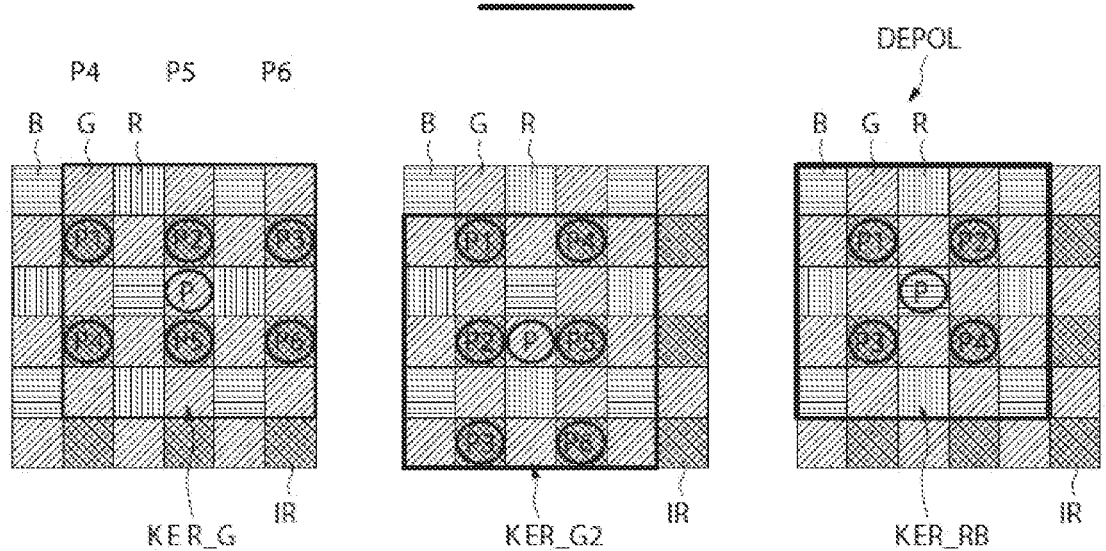
Figure 3:
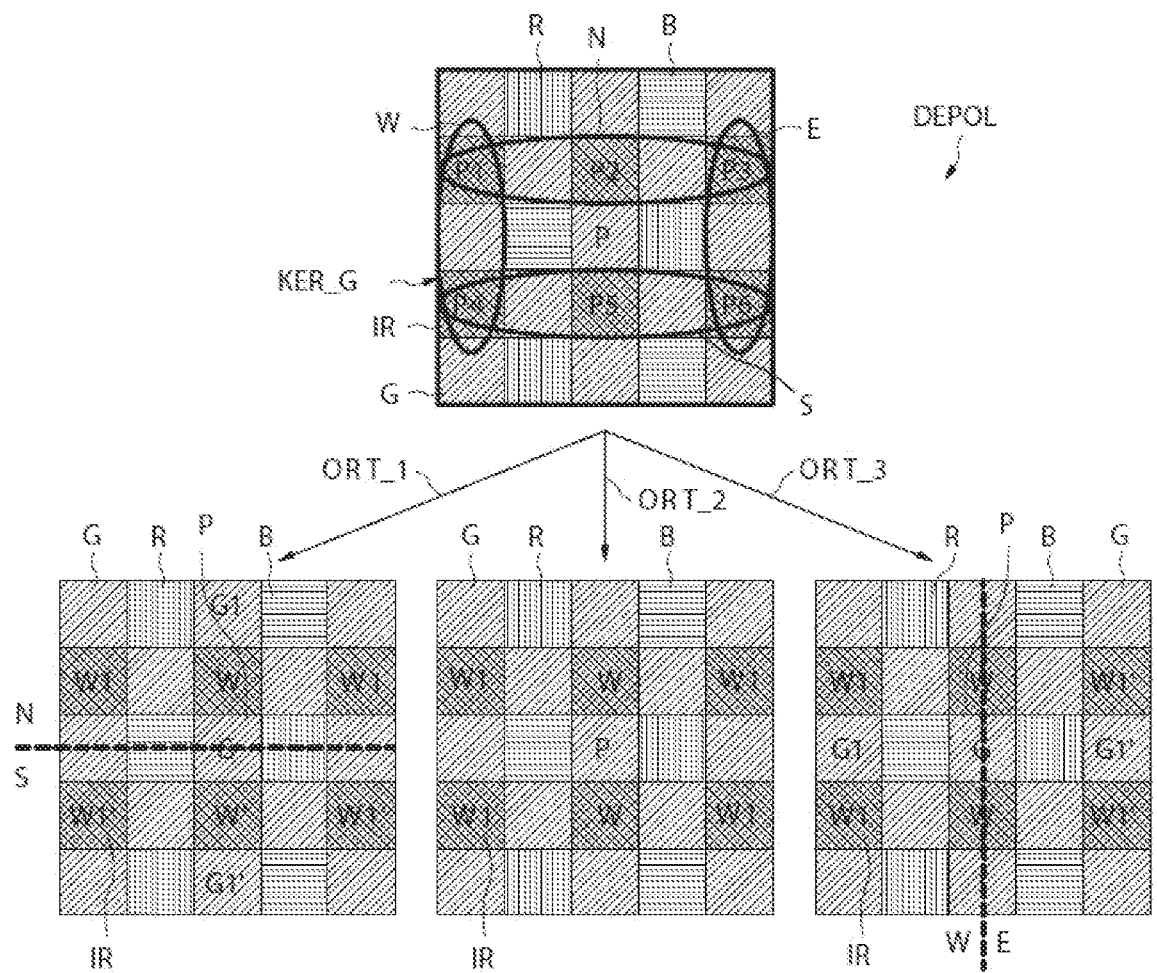
Figure 4:
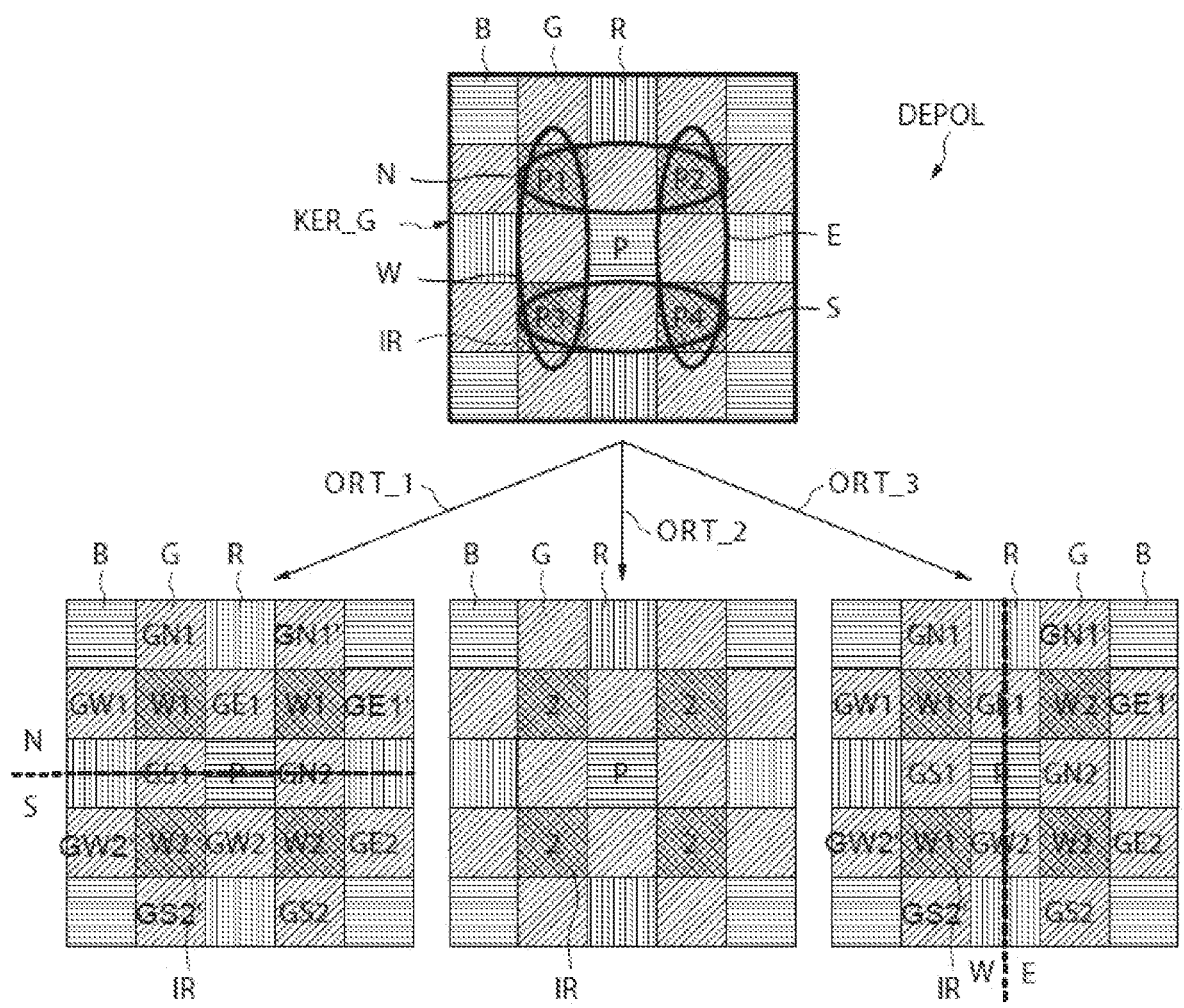

FIGS. 2 to 4 advantageously correspond to the depollution processing DEPOL, wherein the interpolation is implemented so that the interpolated component is the infrared component IR (infrared noise component), and the pixels of interest P have the original red R, green G, and blue B components. Consequently, the reference pixels have the original infrared IR component.

FIG. 2 illustrates the different possible cases of kernel KER and respective reference pixels P1-P6, P1-P4, for two positions of pixels of interest P having the original green component KER_G, KER_G2, and for the position of pixels of interest P having the original red or blue component KER_RB.

Thus, for the pixels of interest P with an original green component G, the kernels KER_G, KER_G2 include six reference pixels P1, P2, P3, P4, P5, P6, distributed either in two rows and three columns KER_G, or in three rows and two columns KER_G2, constituting two perfectly equivalent cases by rotation of a quarter of a turn.

For the pixels of interest P with an original red R or blue B component, the kernel KER_RB includes four reference pixels P1, P2, P3, P4, located at the diagonals of the pixels of interest P. The case illustrated corresponds to a pixel of interest P with original blue component B, but the distribution of the reference pixels P1, P2, P3, P4 is strictly identical for a pixel of interest P with original red component R.

FIG. 3, in relation with the equations Eq.301 to Eq.338, illustrates an example of the interpolation calculations of the value of the interpolated infrared noise component (ITP) within the group KER_G in the case where the pixel of interest P has the original green component.

In the equations, references such as P1, P4, G1 express the value of the component of the pixel designated by the reference.

In this example, the evaluation of the spatial uniformity first comprises an identification of the orientation of spatial variation ORT_1, ORT_2, ORT_3 from a comparison of the components of the reference pixels P1-P6 based on the equations Eq.301 and Eq.302.

$$\text{grad}_{EW}=|(P1+P4)-(P3+P6)| \qquad \text{Eq.301}$$

$$\text{grad}_{NS}=|(P1+P2+P3)-(P4+P5+P6)| \qquad \text{Eq.302}$$

If $\text{grad}_{NS} > \text{grad}_{EW}$, then an orientation of spatial variation ORT_1 is identified in a direction N-S ("North-South"). The calculation of the weights W1, W2, W3, W1', W2', W3' as defined by the equations Eq.311-Eq.319, uses a selection of pixels G, G1, G1' having the original green component, which are aligned with the pixel of interest P in the identified N-S orientation.

The evaluation of the spatial uniformity of the environment of the reference pixels P1-P6, is defined by the equations Eq.311 and Eq.312.

$$\text{grad}=|G1-G| \qquad \text{Eq.311}$$

$$\text{grad}'=|G1'-G| \qquad \text{Eq.312}$$

The calculation of the weights W, W', W1, W1' assigned to the reference pixels P1-P6 at values, which are normalized and proportional to the respective spatial uniformity is defined by the equations Eq.313 to Eq.318.

$$\alpha = \frac{1+grad}{1+grad'} \qquad \text{Eq.313}$$

$$\begin{cases} W2' = \alpha * W2 \\ W1 + W2 + W3 + W1' + W2' + W3' = 1 \\ W1 = W3 = 0.5 * W2 \\ W1' = W3' = 0.5 * W2' \end{cases} \qquad \text{Eq.314}$$

The resolution of the system Eq.314 gives the different values of the weights assigned to the reference pixels P1-P6:

$$W = \frac{1}{2(1+\alpha)} \qquad \text{Eq.315}$$

$$W' = \frac{\alpha}{2(1+\alpha)} \qquad \text{Eq.316}$$

$$W1 = \frac{1}{4(1+\alpha)} \qquad \text{Eq.317}$$

$$W1' = \frac{\alpha}{4(1+\alpha)} \qquad \text{Eq.318}$$

Finally, the interpolated component (ITP) is obtained by calculating the sum of the components of the reference pixels $\{Pi\}_{1 \leq i \leq 6}$ weighted by the respective weights $\{\omega i\}_{1 \leq i \leq 6}$, as defined by the equation Eq.319.

ITP=$\Sigma_i Pi*\omega i$ with $\{\omega i\}_{1 \leq i \leq 6}=\{\omega 1=W1; \omega 2=W;$
$\omega 3=W1; \omega 4=W1'; \omega 5=W'; \omega 6=W1'\}$, as represented in the case ORT_1 compared to the Pi of the kernel KER_G of FIG. 3. \qquad Eq.319

If $\text{grad}_{NS}=\text{grad}_{EW}$, then an orientation of spatial variation ORT_2 is identified in no direction, and the values of the weights W1, W are fixed arbitrarily homogeneously as defined by the equations Eq.321-Eq.323.

$$W=0.25 \qquad \text{Eq.321}$$

$$W1=0.125 \qquad \text{Eq.322}$$

And, the interpolated component (ITP) is obtained by calculating the sum of the components of the reference pixels $\{Pi\}_{1 \leq i \leq 6}$ weighted by the respective weights $\{\omega i\}_{1 \leq i \leq 6}$, as defined by the equation Eq.323.

ITP=$\Sigma_i Pi*\omega i$ with $\{\omega i\}_{1 \leq i \leq 6}=\{\omega 1=W1; \omega 2=W;$
$\omega 3=W1; \omega 4=W1; \omega 5=W; \omega 6=W1\}$, as represented in the case ORT_2 compared to the Pi of the kernel KER_G of FIG. 3. \qquad Eq.323

If $\text{grad}_{NS} < \text{grad}_{EW}$, then an orientation of spatial variation ORT_3 is identified in a direction W-E ("West-East"). The calculation of the weights W1, W2, W3, Wf, W2', W3' as defined by the equations Eq.331-Eq.338, uses a selection of pixels G, G1, G1' having the original green component, which are aligned with the pixel of interest P in the identified W-E orientation.

The evaluation of the spatial uniformity of the environment of the reference pixels P1-P6, is defined by the equations Eq.331 and Eq.332.

$$\text{grad}=|G1-G| \qquad \text{Eq.331}$$

$$\text{grad}'=|G1'-G| \qquad \text{Eq.332}$$

The calculation of the weights W1, W1', W assigned to the reference pixels P1-P6 at values, which are normalized and proportional to the respective spatial uniformity is defined by the equations Eq.333 to Eq.337

$$\alpha = \frac{1+grad}{1+grad'} \qquad \text{Eq.333}$$

$$\begin{cases} W1' = \alpha * W1 \\ 2W + 2W1 + 2W1' = 1 \\ W = 0.25 \end{cases} \qquad \text{Eq.334}$$

The resolution of the system Eq.334 gives the different values of the weights assigned to the reference pixels P1-P6:

$$W1 = \frac{1}{4(1+\alpha)} \qquad \text{Eq.335}$$

$$W1' = \frac{\alpha}{4(1+\alpha)} \qquad \text{Eq.336}$$

$$W = 0.25 \qquad \text{Eq.337}$$

Finally, the interpolated component (ITP) is obtained by calculating the sum of the components of the reference pixels $\{Pi\}_{1 \leq i \leq 6}$ weighted by the respective weights $\{\omega i\}_{1 \leq i \leq 6}$, as defined by equation Eq.338.

ITP=$\Sigma_i Pi*\omega i$ avec$\{\omega i\}_{1 \leq i \leq 6}=\{\omega 1=W1; \omega 2=W;$
$\omega 3=W1; \omega 4=W1'; \omega 5=W; \omega 6=W1'\}$, as represented in the case ORT_3 compared to the Pi of the kernel KER_G of FIG. 3. \qquad Eq.338

FIG. 4, in relation with the equations Eq.401 to Eq.436, illustrates an example of the interpolation calculations of the value of the interpolated infrared noise component (ITP)

within the group KER_RB in the case where the pixel of interest P has the original blue component B.

In the equations, the references such as P1, P4, GN1 express the value of the component of the pixel designated by the reference.

In this example, the evaluation of the spatial uniformity first comprises an identification of the orientation of spatial variation ORT_1, ORT_2, ORT_3 from a comparison of the components of the reference pixels P1-P4 based on the equations Eq.401, Eq.402.

$$\text{grad}_{EW}=|(P1+P3)-(P2+P4)| \quad \text{Eq.401}$$

$$\text{grad}_{NS}=|(P1+P2)-(P3+P4)| \quad \text{Eq.402}$$

If $\text{grad}_{NS} > \text{grad}_{EW}$, then an orientation of spatial variation ORT_1 is identified in a direction N-S ("North-South"), and the calculation of the weights W1, W2, as defined by the equations Eq.411-Eq.416, uses pixel selection GN1, GW1, GE1, GS1, GN1', GE1', GN2 and respectively GN2, GW2, GE2, GS2, GS2', GW2', GS1 having the original green component, which are adjacent with reference pixels P1, P2, P3, P4.

The evaluation of the spatial uniformity of the environment of the reference pixels P1-P4, is defined by the equations Eq.411 and Eq.412.

grad1=max(GN1;GS1;GE1;GW1)−min(GN1;GS1;
  GE1;GW1)+max(GN1';GN2;GE1;GE1')−min
  (GN1';GN2;GE1;GE1') Eq.411 grad2=max(GN2;GS2;GE2;GW2)−min(GN2;GS2;
  GE2;GW2)+max(GS1;GS2';GW2';GW2)−min
  (GS1;GS2';GW2';GW2) Eq.412

The calculation of the weights W1, W2 assigned to the reference pixels P1-P4 at values, which are normalized and proportional to the respective spatial uniformity is defined by the equations Eq.413 to Eq.415.

$$\alpha = \frac{1 + grad1}{1 + grad2} \quad \text{Eq.413}$$

$$W1 = \frac{1}{2(1+\alpha)} \quad \text{Eq.414}$$

$$W2 = \frac{\alpha}{2(1+\alpha)} \quad \text{Eq.415}$$

Finally, the interpolated component (ITP) is obtained by calculating the sum of the components of the reference pixels $\{Pi\}_{1\leq i\leq 4}$ weighted by the respective weights $\{\omega i\}_{1\leq i\leq 4}$, as defined by the equation Eq.416.

ITP=$\Sigma_i Pi^* \omega i$ with $\{\omega i\}_{1\leq i\leq 4}$={ω1=W1; ω2=W1;
  ω3=W2; ω4=W2}, as represented in the case
  ORT_1 compared to the Pi of the kernel
  KER_RB of FIG. 4. Eq.416

If $\text{grad}_{NS}=\text{grad}_{EW}$, then an orientation of spatial variation ORT_2 is identified in no direction, and the values of the weights are fixed arbitrarily homogeneously as defined by the equations Eq.421-Eq.422.

$$W=0.25 \quad \text{Eq.421}$$

And, the interpolated component (ITP) is obtained by calculating the sum of the components of the reference pixels $\{Pi\}_{1\leq i\leq 4}$ weighted by the respective weights $\{\omega i\}_{1\leq i\leq 4}$, as defined by the equation Eq.422.

ITP=$\Sigma_i Pi^* \omega i$ with $\{\omega i\}_{1\leq i\leq 6}$={ω1=W; ω2=W; ω3=W;
  ω4=W}, as represented in the case ORT_2 compared to the Pi of the kernel KER_RB of FIG. 4. Eq.422

If $\text{grad}_{NS}<\text{grad}_{EW}$, then an orientation of spatial variation ORT_3 is identified in a direction W-E ("West-East"). The calculation of the weights W1, W2, as defined by the equations Eq.431-Eq.436, uses pixel selection GN1, GW1, GE1, GS1, GW2', GW2, GS2' and respectively GN2, GW2, GE2, GS2, GE1', GE1 having the original green component, which are adjacent with at least some of the reference pixels P1, P2, P3, P4.

The evaluation of the spatial uniformity of the environment of the reference pixels P1-P4 is defined by the equations Eq.431 and Eq.432.

grad1=max(GN1;GS1;GE1;GW1)−min(GN1;GS1;
  GE1;GW1)+max(GS1;GS2';GW2';GW2)−min
  (GS1;GS2';GW2';GW2) Eq.431 grad2=max(GN2;GS2;GE2;GW2)−min(GN2;GS2;
  GE2;GW2)+max(GN1';GE1';GN2;GE1)−min
  (GN1';GE1';GN2;GE1) Eq.432

The calculation of the weights W1, W2 assigned to the reference pixels P1-P4 at values which are normalized and proportional to the respective spatial uniformity is defined by the equations Eq.433 to Eq.435

$$\alpha = \frac{1 + grad1}{1 + grad2} \quad \text{Eq.433}$$

$$W1 = \frac{1}{2(1+\alpha)} \quad \text{Eq.434}$$

$$W2 = \frac{\alpha}{2(1+\alpha)} \quad \text{Eq.435}$$

Finally, the interpolated component (ITP) is obtained by calculating the sum of the components of the reference pixels $\{Pi\}_{1\leq i\leq 4}$ weighted by the respective weights $\{\omega i\}_{1\leq i\leq 4}$, as defined by the equation Eq.436.

ITP=$\Sigma_i Pi^* \omega i$ with $\{\omega i\}_{1\leq i\leq 4}$={ω1=W1; ω2=W2;
  ω3=W1; ω4=W2}, as represented in the case
  ORT_3 compared to the Pi of the kernel
  KER_RB of FIG. 4. Eq.436

Figure 5:
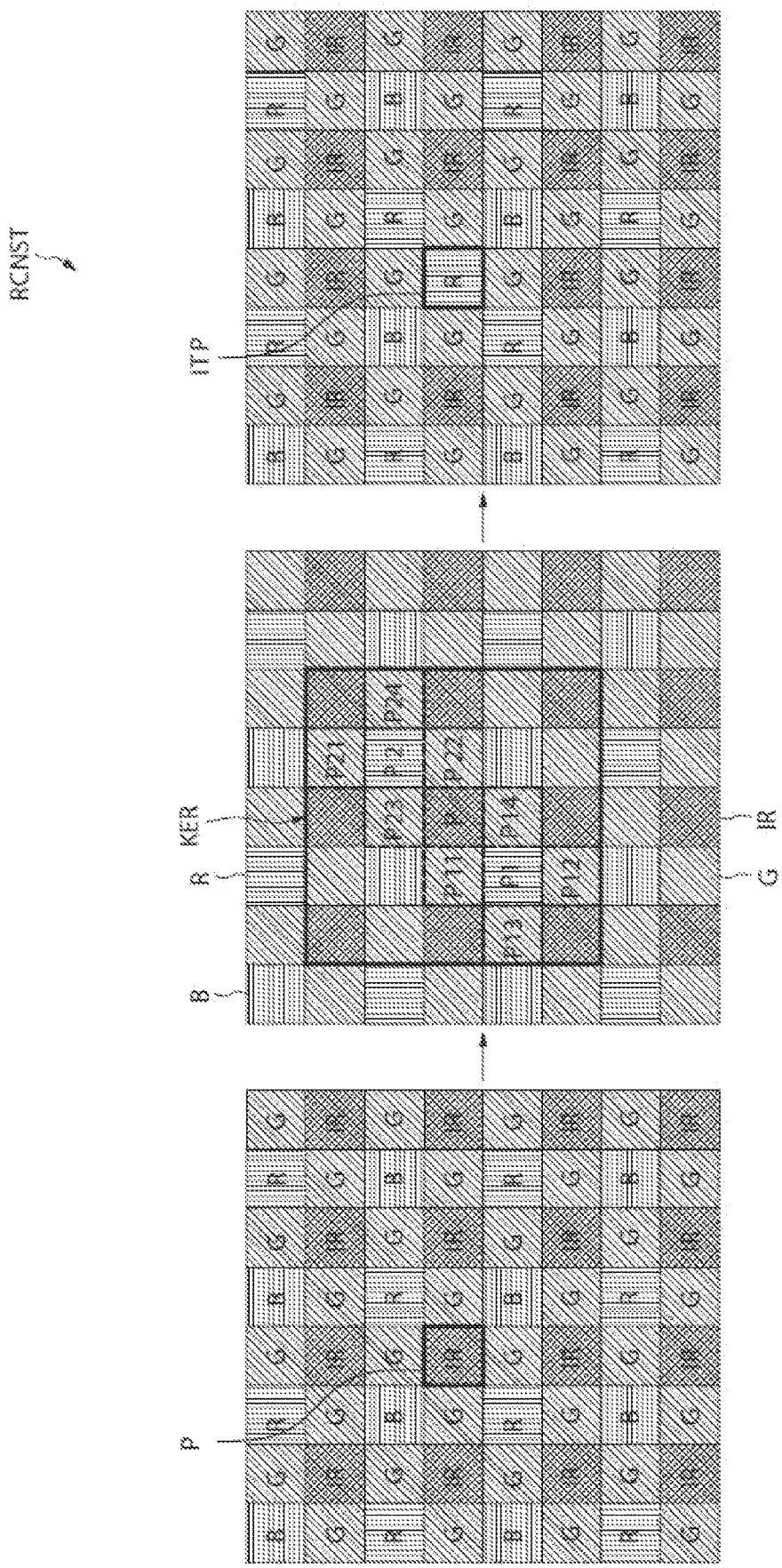

FIG. 5 advantageously corresponds to the reconstruction processing of a visible component instead of an infrared component RCNST, where the interpolation is implemented so that the interpolated components are the red R and blue B components, and the pixels of interest P have the original infrared IR component. Consequently, the reference pixels have the original red R and blue B components.

Equations Eq.501 to Eq.506 describe an example of interpolation calculations of the value of the red or blue interpolated component within the group KER in the case where the pixel of interest P has the original infrared component IR.

In the equations, the references such as P1, P2, P11, express the value of the component of the pixel designated by the reference.

The case illustrated in relation to FIG. 5 corresponds to the red interpolated component R, the reference pixels P1, P2 being the two pixels having the original red component R in the kernel KER. The substitution of the red pixels by the blue pixels of the kernel KER directly gives the case where the interpolated component is blue.

The evaluation of the spatial uniformity of the environment of the reference pixels P1, P2 is defined by the equations Eq.501 and Eq.502.

grad1=max(P11,P12,P13,P14)−min(P11,P12,P13,
  P14) Eq.501 grad2=max(P21,P22,P23,P24)−min(P21,P22,P23,
  P24) Eq.502

The calculation of the weights ω1, ω2 assigned to the reference pixels P1, P2 at values, which are normalized and proportional to the respective spatial uniformity is defined by the equations Eq.503 to Eq.505.

$$\alpha = \frac{1 + grad2}{1 + grad1} \qquad \text{Eq.503}$$

$$\omega 1 = \frac{\alpha}{1 + \alpha} \qquad \text{Eq.504}$$

$$\omega 2 = \frac{1}{1 + \alpha} \qquad \text{Eq.505}$$

Finally, the interpolated component (ITP) is obtained by calculating the sum of the components of the reference pixels $\{Pi\}_{1 \leq i \leq 2}$ weighted by the respective weights $\{\omega i\}_{1 \leq i \leq 2}$, as defined by the equation Eq.506.

$$ITP = \Sigma_i Pi * \omega i \qquad \text{Eq.506}$$

FIG. 6 advantageously corresponds to the formatting processing RBAYR of a matrix of pixels in the Bayer format, where the interpolation is implemented so that the interpolated components are either red R or blue B, the pixels of interest P (shown with a white fill in FIG. 6) have an original component which is respectively either blue B or red R. Consequently, the reference pixels P1-P6 have the original components respectively either red R or blue B.

Equations Eq.601 to Eq.630 describe an example of interpolation calculations of the value of the red or blue interpolated component, within the group KER in the case where the pixel of interest P has the original blue or red component.

In the equations, the references such as P1, P6, GN2, express the value of the component of the pixel designated by the reference.

The case illustrated in relation to FIG. 6 corresponds to the blue interpolated component, the reference pixels P1-P6 being the pixels having the original blue component B in the kernel KER. The substitution of the red pixels by the blue pixels of a corresponding kernel directly gives the case where the interpolated component is blue.

The evaluation of the spatial uniformity of the environment of the reference pixels P1-P4 is defined by the equations Eq.601 to Eq.606.

$$gradNS = |GN - GS| \qquad \text{Eq.601}$$

$$gradEW = |GE - GW| \qquad \text{Eq.602}$$

$$gradDiag1 = |GN - GE| \qquad \text{Eq.603}$$

$$gradDiag2 = |GW - GS| \qquad \text{Eq.604}$$

$$gradDiag3 = |GN - GW| \qquad \text{Eq.605}$$

$$gradDiag4 = |GE - GS| \qquad \text{Eq.606}$$

The calculation of the weights WNormNS, WNormEW, WNormDiag assigned to the reference pixels P1-P6 at values, which are normalized and proportional to the respective spatial uniformity is defined by the equations Eq.611 to Eq.617.

$$InvGradNS = \frac{1}{1 + gradNS} \qquad \text{Eq.611}$$

$$InvGradEW = \frac{1}{1 + gradEW} \qquad \text{Eq.612}$$

$$InvGradDiag = \frac{1}{1 + Avg(gradDiag1; gradDiag2; gradDiag3; gradDiag4)}, \qquad \text{Eq.613}$$

where Avg ( ) is a conventional "average" function.

$$Sum = InvGradNS + InvGradEW + InvGradDiag \qquad \text{Eq.614}$$

$$WNorm_{NS} = \frac{InvGradNS}{Sum} \qquad \text{Eq.615}$$

$$WNorm_{EW} = \frac{InvGradEW}{Sum} \qquad \text{Eq.616}$$

$$WNorm_{Diag} = \frac{InvGradDiag}{Sum} \qquad \text{Eq.617}$$

An average component in the orientation N-S "North-South" PNS, an average component in the orientation E-W "East-West" PEW and an average component in the diagonal orientation PDiag, are further defined by the equations Eq.621 to Eq.628

$$P_{NS} = \frac{P1 + P6}{2} \qquad \text{Eq.621}$$

$$P_{EW} = \frac{P3 + P4}{2} \qquad \text{Eq.622}$$

The spatial uniformity of the environment of the reference pixels P2, P5 is evaluated for the average component in the diagonal orientation PDiag:

$$grad1 = \max(GN2, GS2, GE2, GW2) - \min(GN2, GS2, GE2, GW2) \qquad \text{Eq.623}$$

$$grad2 = \max(GN5, GS5, GE5, GW5) - \min(GN5, GS5, GE5, GW5) \qquad \text{Eq.624}$$

The weights ω1, ω2 assigned to the reference pixels P2, P5 for the average component in the diagonal orientation PDiag is calculated:

$$\alpha = \frac{1 + grad1}{1 + grad2} \qquad \text{Eq.625}$$

$$\omega 1 = \frac{1}{1 + \alpha} \qquad \text{Eq.626}$$

$$\omega 2 = \frac{\alpha}{1 + \alpha} \qquad \text{Eq.627}$$

$$P_{Diag} = \omega 1 * P2 + \omega 2 * P5 \qquad \text{Eq.628}$$

Finally, the interpolated component ITP is obtained by calculating the sum of the average components in the respective orientations PNS, PEW, PDiag weighted by the respective weights WNormNS, WNormEW, WNormDiag, as defined by the equation Eq.630.

$$ITP = WNorm_{NS} * P_{NS} + WNorm_{EW} * P_{EW} + WNorm_{Diag} * P_{Diag} \qquad \text{Eq.630}$$

The exemplary embodiments and implementations described above thus propose an interpolation technique adapted for three types of image processing operations, adapted for processing an image of the RGB-IR matrix type at the input of an image processing unit ISP. The interpolation technique takes into account variations in textures and edges in the image by means of an evaluation of the spatial uniformity of the reference pixels. The weights assigned to the reference pixels are adjusted based on the spatial uniformity evaluated for the respective pixels. The adjustment of the weights is done so that the strongest weights are given to the pixels located in the "flattest" i.e., the most uniform areas. This allows to improve the image quality and leads to more faithful reproduction.

Examples of principle calculations have been given in this regard; however, the invention is not limited to these examples of embodiment, implementation and calculations, but encompasses all the variants, for example, it is possible to provide for improving the calculations by using conventional means, for example to proportion the amount of infrared noise to be subtracted in the depollution mechanism, by the ratio between the energy accumulated on the infrared band by the color pixel to be depolluted and the energy accumulated over the entire spectrum (visible and infrared) accumulated by the infrared pixel, it is also possible to dimension the size of the kernel "KER" differently according to the type of elementary pattern of the matrix processed.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A method for processing a pixel matrix in an image processing chain circuit couplable to an imager circuit, each pixel comprising an original component of one of an original red, an original green, an original blue, or an original infrared component, the method comprising:
   interpolating an interpolated component different from the original component of a pixel of interest from components of a group of pixels neighboring the pixel of interest, the interpolating comprising:
   calculating a sum of the components of reference pixels weighted by an assigned weight, the reference pixels being pixels of the group of pixels having the same original component as the interpolated component,
   evaluating a spatial uniformity of each reference pixel in an environment within the group of pixels, wherein the evaluating the spatial uniformity comprises:
   calculating a gradient of components of pixels having an original green component adjacent to the reference pixels,
   identifying an orientation of spatial variation from a comparison of the components of the reference pixels, and
   selecting pixels with an original green component as used for the calculating the gradient of components of pixels based on the orientation of the spatial variation as identified; and
   calculating assigned weights of the reference pixels with values normalized and proportional to the spatial uniformity.

2. The method of claim 1, wherein calculating the gradient of components of pixels comprises measuring an absolute difference between a greatest value and a smallest value of components of pixels having an original green component adjacent to the reference pixels.

3. The method of claim 1, wherein the group of pixels comprises a set of pixels belonging to a square of pixels having an odd number of pixels on each side, the pixel of interest located at a center of the square of pixels.

4. The method of claim 1, wherein the pixel matrix is delivered to the image processing chain circuit by the imager circuit in accordance with an elementary pattern of a red-green-blue-infrared (RGB-IR) 4×4 type having two red pixels, eight green pixels, two blue pixels, and four infrared pixels, each red pixel, blue pixel, and infrared pixel arranged such that it is adjacent only to green pixels.

5. The method of claim 1, wherein the interpolating is implemented in a processing of depollution of an infrared noise from the pixel matrix, the interpolated component being an infrared component, the pixel of interest having an original red component, an original green component, and an original blue component.

6. The method of claim 1, wherein the interpolating is implemented in a processing of reconstruction of a visible component instead of an infrared component, the interpolated component being a red component and a blue component, the pixel of interest having an original infrared component.

7. The method of claim 1, wherein the interpolating is implemented in a processing for formatting the pixel matrix into a Bayer matrix, the interpolated component being one of a red component or a blue component, the pixel of interest having one of an original blue component or an original red component.

8. An electronic device, comprising:
   an image processing chain circuit couplable to an imager circuit, the image processing chain circuit configured to:
   process a pixel matrix, each pixel comprising an original component of one of an original red, an original green, an original blue, or an original infrared component; and
   determine an interpolated component different from the original component of a pixel of interest from components of a group of pixels neighboring the pixel of interest, the image processing chain circuit, to determine the interpolated component, is configured to:
   calculate a sum of the components of reference pixels weighted by an assigned weight, the reference pixels being pixels of the group of pixels having the same original component as the interpolated component,
   evaluate a spatial uniformity of each reference pixel in an environment within the group of pixels, wherein the evaluating the spatial uniformity comprises:

calculating a gradient of components of pixels having an original green component adjacent to the reference pixels, identifying an orientation of spatial variation from a comparison of the components of the reference pixels, and selecting pixels with an original green component as used for the calculating the gradient of components of pixels based on the orientation of the spatial variation as identified, and calculate assigned weights of the reference pixels with values normalized and proportional to the spatial uniformity.

9. The electronic device of claim 8, wherein the image processing chain circuit, to calculate the gradient of components of pixels, is configured to measure an absolute difference between a greatest value and a smallest value of components of pixels having an original green component adjacent to the reference pixels.

10. The electronic device of claim 8, wherein the group of pixels comprises a set of pixels belonging to a square of pixels having an odd number of pixels on each side, the pixel of interest located at a center of the square of pixels.

11. The electronic device of claim 8, wherein the image processing chain circuit is configured to process a pixel matrix in accordance with an elementary pattern of a red-green-blue-infrared (RGB-IR) 4×4 type having two red pixels, eight green pixels, two blue pixels, and four infrared pixels, each red pixel, blue pixel, and infrared pixel arranged such that it is adjacent only to green pixels.

12. The electronic device of claim 8, wherein the image processing chain circuit comprises a processor for depolluting an infrared noise from the pixel matrix, the interpolated component being an infrared component, the pixel of interest having an original red component, an original green component, and an original blue component.

13. The electronic device of claim 8, wherein the image processing chain circuit comprises a processor for reconstructing a visible component instead of an infrared component, the interpolated component being a red component and a blue component, the pixel of interest having an original infrared component.

14. The electronic device of claim 8, wherein the image processing chain circuit comprises a processor for formatting the pixel matrix into a Bayer matrix, the interpolated component being one of a red component or a blue component, the pixel of interest having one of an original blue component or an original red component.

15. An image processing chain circuit configured to:
process a pixel matrix, each pixel comprising an original component of one of an original red, an original green, an original blue, or an original infrared component; and
interpolate an interpolated component different from the original component of a pixel of interest from components of a group of pixels neighboring the pixel of interest, wherein the image processing chain circuit, to determine the interpolated component, is configured to:

calculate a sum of the components of reference pixels weighted by an assigned weight, the reference pixels being pixels of the group of pixels having the same original component as the interpolated component, evaluate a spatial uniformity of each reference pixel in an environment within the group of pixels, wherein the evaluating the spatial uniformity comprises:

calculating a gradient of components of pixels having an original green component adjacent to the reference pixels, identifying an orientation of spatial variation from a comparison of the components of the reference pixels; and selecting pixels with an original green component as used for the calculating the gradient of components of pixels based on the orientation of the spatial variation as identified, and calculate assigned weights of the reference pixels with values normalized and proportional to the spatial uniformity.

16. The image processing chain circuit of claim 15, wherein the image processing chain circuit is configured to process a pixel matrix in accordance with an elementary pattern of a red-green-blue-infrared (RGB-IR) 4×4 type having two red pixels, eight green pixels, two blue pixels, and four infrared pixels, each red pixel, blue pixel, and infrared pixel arranged such that it is adjacent only to green pixels.

17. The image processing chain circuit of claim 15, wherein the image processing chain circuit, to calculate the gradient of components of pixels, is configured to measure an absolute difference between a greatest value and a smallest value of components of pixels having an original green component adjacent to the reference pixels.

18. The image processing chain circuit of claim 15, wherein the group of pixels comprises a set of pixels belonging to a square of pixels having an odd number of pixels on each side, the pixel of interest located at a center of the square of pixels.

19. The image processing chain circuit of claim 15, wherein the interpolating is implemented in a processing of depollution of an infrared noise from the pixel matrix, the interpolated component being an infrared component, the pixel of interest having an original red component, an original green component, and an original blue component.

20. The image processing chain circuit of claim 15, wherein the interpolating is implemented in a processing of reconstruction of a visible component instead of an infrared component, the interpolated component being a red component and a blue component, the pixel of interest having an original infrared component.

* * * * *